United States Patent [19]
Ollearo

[11] 3,715,167
[45] Feb. 6, 1973

[54] CONTROL DEVICE FOR A BORING TOOL HOLDER OF MACHINE TOOLS

[75] Inventor: Giorgio Ollearo, 10015 Ivrea (Turin), Italy

[73] Assignee: Ing. C. Olivetti & C., S.p.A., Ivrea (Turin), Italy

[22] Filed: June 2, 1970

[21] Appl. No.: 42,727

[30] Foreign Application Priority Data

June 21, 1969  Italy.................................52333 A/69

[52] U.S. Cl..................................408/149, 408/197
[51] Int. Cl. .............................................B23b 29/034
[58] Field of Search..............408/197, 185, 148, 149; 27/568

[56] References Cited

UNITED STATES PATENTS

| | | | |
|---|---|---|---|
| 1,194,352 | 8/1916 | Bradley | 408/149 |
| 3,520,228 | 7/1970 | Wohlfeil | 29/568 X |
| 2,461,732 | 2/1949 | Hansen | 408/185 |
| 2,520,342 | 8/1950 | Ross | 408/185 |
| 2,990,730 | 7/1961 | Pougnand | 408/148 |

FOREIGN PATENTS OR APPLICATIONS

| | | | |
|---|---|---|---|
| 517,556 | 2/1940 | Great Britain | 408/185 |

*Primary Examiner*—Andrew R. Juhasz
*Assistant Examiner*—Z. R. Blinsky
*Attorney*—Birch, Swindler, McKie & Beckett

[57] ABSTRACT

In a machine tool comprising a spindle and means to align the spindle in a predetermined angular position about its own axis, a tool holder is adapted to be fixed to the spindle, the toolholder comprises a body engageable with the spindle and a slide radially shiftable on said body, and normally locked on said body. A single member fixed to the worktable carries two abutments at 90° to one another with one abutment parallel to said slide when said spindle is aligned, each other in two directions parallel to said abutments respectively and cooperating with said slide to unlock it and to produce a radial shifting of the slide on said body.

8 Claims, 6 Drawing Figures

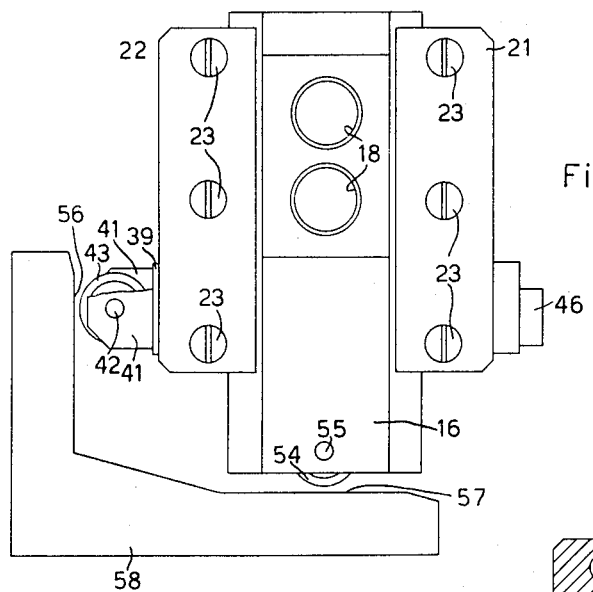
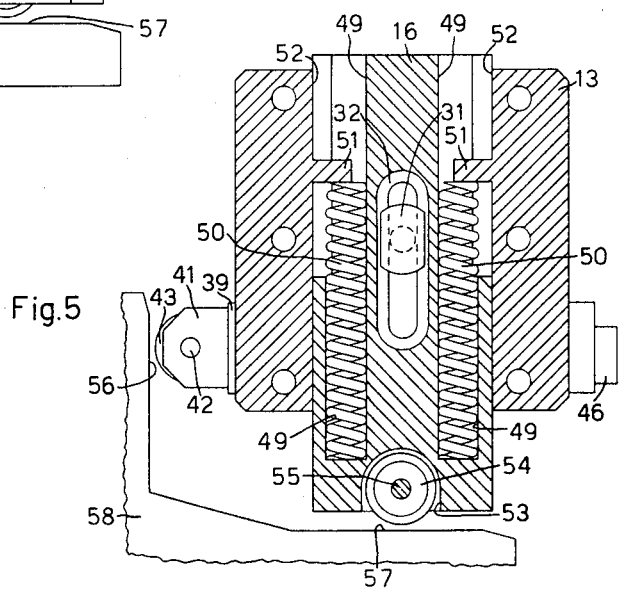
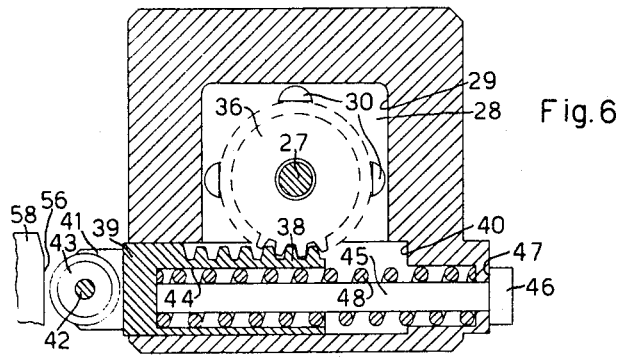

CONTROL DEVICE FOR A BORING TOOL HOLDER OF MACHINE TOOLS

CROSS REFERENCE TO RELATED APPLICATION

Applicant claims priority from corresponding Italian application Ser. No. 52333-A/69 filed June 21, 1969.

BACKGROUND OF THE INVENTION

1. Field of the invention

The present invention relates to a toolholder, for example a holder for a boring tool, for a machine tool having a spindle adapted to be oriented in a predetermined angular position about its own axis before commencing a machining operation. The toolholder is of the type comprising a body engageable with the spindle and a slide shiftable on the body and adapted to carry the tool.

2. Description of the prior art

There are known various devices for controlling a toolholder in which the tool can be shifted radially for the purpose of making bores of different diameters. In a known device, the shifting of the toolholder is obtained by utilizing the rotary motion of the spindle to which the toolholder is fitted by means of pairs of gears disposed inside the toolholder itself. This arrangement is bulky, however, and is not adapted to permit adjustment of the position of the slide when the spindle is stationary.

SUMMARY OF THE INVENTION

These disadvantages are obviated by the present invention, which provides a toolholder for fixing to the spindle of a machine tool adapted to align the spindle in a predetermined angular position about its own axis, the toolholder comprising a body for fixing to the spindle, a tool-holding slide mounted slidably on the body, and locking means arranged normally to lock the slide relative to the body, the locking means being adapted to unlock the slide by pressure of an operating member thereof against an abutment fixed to the machine tool when the aligned spindle and abutment are moved relative to one another to produce such pressure.

A preferred embodiment of the invention is presented by way of example in the following description and shown in the accompanying drawings.

BRIEF DESCRIPTION OF THE DRAWING

FIG. 4 is a front view of the toolholder;

FIG. 5 is a cross-section of the toolholder taken on the line V—V of FIG. 2;

FIG. 6 is a cross-section of the toolholder taken on the line VI—VI of FIG. 2.

DESCRIPTION OF THE PREFERRED EMBODIMENTS

Figure 1:
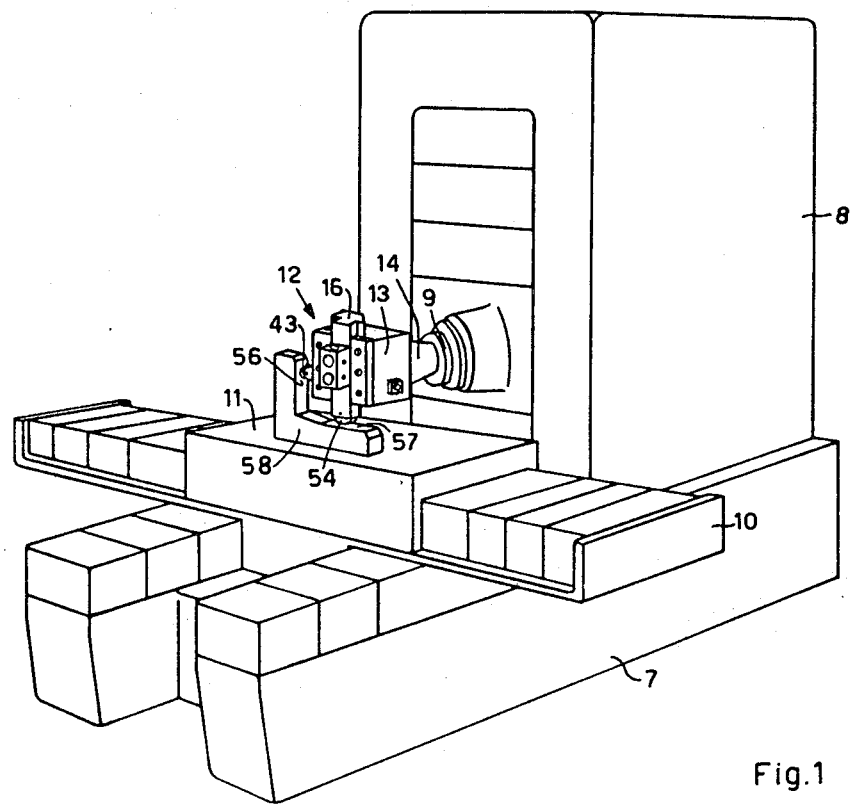
FIG. 1 is a perspective view of a machine tool with a toolholder embodying the invention.

Referring to FIG. 1, the machine tool includes a bed 7 to which there is fixed a standard 8 on which a rotary spindle 9 is mounted. The spindle is carried by a slide movable vertically under the command of a numerical control apparatus not shown in the drawing. A slide 10 is slidable on the bed 7 in a direction parallel to the axis of the spindle 9 under the command of the numerical control apparatus. Finally, a worktable 11 is slidable on the slide 10, likewise under the command of the numerical control apparatus, in a direction perpendicular to the direction of movement of the slide 10. Before commencing a machining operation, the spindle 9 is oriented in a predetermined angular position by means of an orienting device, for example of the type described in the U.S. Pat. application Ser. No. 548,534 filed July 29, 1968.

Figure 2:
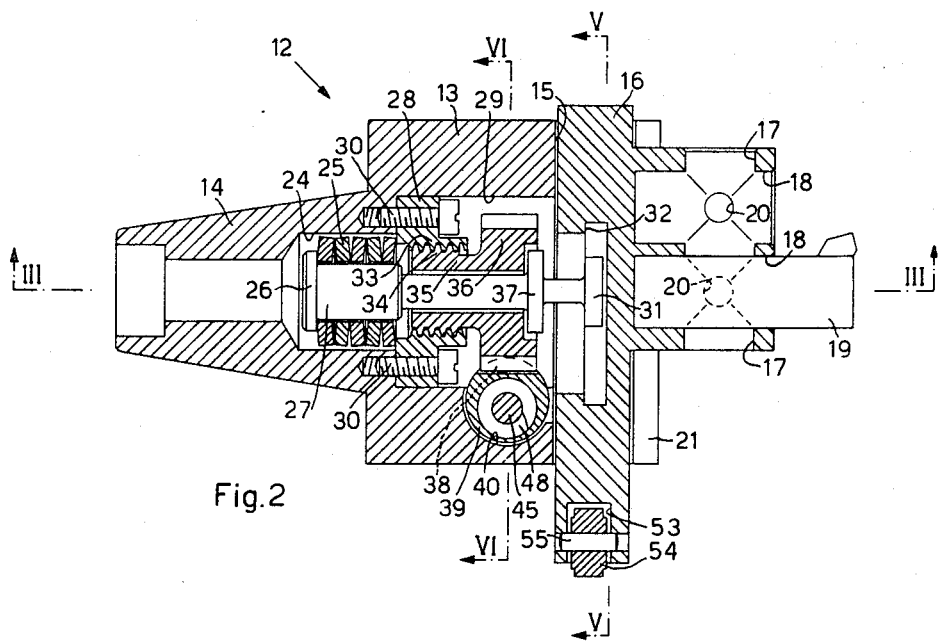
FIG. 2 is a median vertical section of the toolholder.

Any toolholder having a conical tang can be fixed on the spindle 9 in a manner known per se. For the purpose of forming bores of different diameters, a special toolholder 12 can be mounted on the spindle. This toolholder includes a body 13 of substantially parallelepipedal form provided with a conical connecting tang 14 which can be inserted in the spindle 9. Inside the body 13 and perpendicular to its axis there is formed a prismatic guide 15 (FIGS. 2 and 3) in which a toolslide 16 can slide. This toolslide is provided with a radial cylindrical seat 17 and two axial cylindrical seats 18 disposed at different distances from the axis of the toolholder 12. A boring tool 19 is housed in one of the seats 18, as in FIGS. 2 and 3, when machining operations are to be carried out on diameters which do not exceed twice the maximum travel of the slide 16, while the tool is housed in the other seat 18 when the diameters to be machined exceed this dimension, but do not exceed the sum of this dimension and the distance between the two seats. Finally, the tool 19 is housed in the seat 17 for even larger diameters. In the proximity of the three seats 17 and 18 there are formed threaded holes 20 adapted to accommodate setscrews for clamping the tool 19 in one of the three seats. Two plates 21 and 22 (FIG. 3) fixed to the body 13 by means of screws 23 close the guide 15.

Inside the body 13 there is a cylindrical cavity 24 in which there is housed a stack of cup (Belleville) springs 25 adapted to cooperate with a flange 26 of a rod 27 and a flange 28 arranged in a prismatic cavity 29 (FIG. 6) of the body 13 and fixed to the body by means of screws 30. The rod 27 has a flange 31 normally engaged in a T-shaped recess 32 formed inside the slide 16 (FIG. 5), as a result of which the springs normally keep the slide 16 locked within the guide 15.

Figure 3:
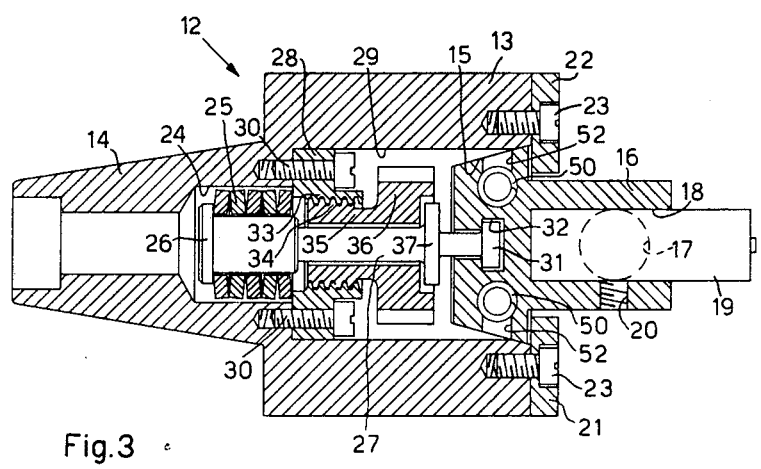
FIG. 3 is a section of the toolholder taken on the line III—III of FIG. 2.

The flange 28 (FIG. 2) is provided with a female thread 33 into which is screwed the thread 34 of a sleeve 35. This sleeve is arranged concentrically with the rod 27 and is integral with a gear 36 which is adapted to abut another flange 37 of the rod 27, but is normally spaced therefrom. The gear 36 meshes with a rack 38 (FIG. 6) formed on a cylinder 39 slidable in a recess 40 perpendicular both to the cavity 29 and to the guide 15 (FIG. 3). At one end of the cylinder 39 there are arranged two lugs 41 between which a first roller 43 is supported on a pin 42.

The cylinder 39 is provided with an eccentric recess 44 (FIG. 6) in which there is fixed a rod 45 provided at one end with a flange 46 normally bearing against a wall 47 of the body 13 through the action of a compression spring 48.

Inside the slide 16 and parallel to the recess 32 there are formed two bores 49 (FIG. 5). In each of these bores there is housed a compression spring 50 which abuts at one end against a corresponding projection 51 integral with the body 13 and at the other end against the base of the bore 49 itself. The springs 50 normally do not succeed in overcoming the frictional force generated by the cup springs 25 (FIG. 3) between the guide 15 and the slide 16, so that the slide 16 does not normally shift with respect to the body 13. Two slots 52 formed in the slide 16 enable the projections 51 to extend into the bores 49.

The lower end of the slide 16 is provided with a recess 53 in which there is housed another roller 54 pivoted on a pin 55. The rollers 43 and 54 are adapted to cooperate with two faces 56 and 57, respectively, which are perpendicular to one another, of an angle iron 58 fast with the worktable 11 of the machine.

The control device described operates in the following manner:

Let it be assumed that the toolholder 12 (FIG. 1) is inserted in the spindle 9 by means of the conical connection 14. First of all, the spindle is oriented in an angular position such that the slide 16 is in a vertical position with the roller 54 facing the worktable 11 of the machine. Let it moreover be assumed that it is desired to produce a bore with a predetermined diameter less than twice the travel that the slide 16 is allowed. The tool 19 is then fixed in the corresponding cylindrical seat 18 and is clamped by means of a setscrew in the threaded hole 20. From this moment, control of the toolholder 12, for arranging the tool 19 in such manner as to bore the desired diameter, is effected automatically under the command of the numerical control apparatus, which operates in accordance with data recorded for the programme of the cycle of the machine and the dimensions to which the machining operations must be carried out.

Under the control of this programme, the worktable 11 (FIG. 1) is first shifted transversely until the face 56 of the angle iron 58 comes into contact with the roller 43 and the spindle 9 is caused to translate vertically until the roller 54 is brought into contact with the face 57 of the angle iron 58. Then, to effect the release of the slide 16, the table 11 is caused to move further to the right, as is, therefore, the angle iron 58 fast therewith. In fact, the roller 43 (FIG. 6), urged by the face 56 and overcoming the action of the spring 48, causes the cylinder 39 to be displaced inside the recess 40. The rack 38 thus causes the gear 36 to rotate anticlockwise together with the sleeve 35. Through the medium of the thread 34 (FIG. 2), the sleeve is unscrewed from the thread 33, as a result of which the sleeve 35 and the gear 36 are shifted towards the slide 16 and engage the flange 37. The rod 27 is now urged positively towards the slide 16, overcoming the action of the springs 25 and disengaging the flange 31 from the T-shaped recess 32, so that the slide 16 is unlocked.

By now causing the spindle 9 (FIG. 1) to shift vertically the slide 16 is positioned, as is, therefore, the tool 19 housed therein, at the desired dimension. More particularly, with a downward movement of the spindle 9 there is effected an equal upward movement or shifting of the slide 16 with respect to the body 13 (FIG. 5) and, therefore, an equal variation in the radius of the tool 19 in opposition to the action of the springs 50. On the other hand, with an upward movement of the spindle 9, the springs 50 cause the slide 16 to shift downward correspondingly with respect to the body 13, producing an equal variation in the radius of the tool 19.

The tool 19 having been positioned at the desired dimension, the worktable 11 is moved in the opposite direction to the previous one, so that the face 56 of the angle iron 58 is disengaged from the roller 43. The spring 48 thus brings the cylinder 39 back into the starting position and, through the rack 38, causes the gear 36 to rotate clockwise. The thread 34 of the sleeve 35 is thus screwed into the corresponding thread 33 of the flange 30 until the sleeve 35 and the gear 36 are brought back into the initial position, releasing the flange 37 of the rod 27. Due to the action of the springs 25, the rod 27 now causes its flange 31 to re-engage the T-shaped recess 32, thus locking the slide 16 in the position reached. The arrangement is then ready to effect the machining.

It is understood that various modifications and improvements may be made in the arrangement described without departing from the scope of the invention. For example, the movements of the table 11 and the spindle 9 may be controlled manually instead of by the numerical control apparatus.

What I claim is:

1. A tool holder for fixing to the spindle of a machine tool adapted to align said spindle to a predetermined angular position about the spindle axis, said tool holder having a body for attachment to said spindle, a tool holding slide mounted slidably on said body, and locking means arranged normally to lock said slide relative to said body, wherein the improvement comprises an abutment fixed to the machine tool, an operating member for causing said locking means to unlock said slide by pressure thereof against said abutment, means for moving the aligned spindle and said abutment relative to one another to produce such pressure, and wherein said slide is slideable in a prismatic guide on said body, and said locking means comprises a rod movable axially in said body and urged by elastic means in a direction such as to clamp said slide against said prismatic guide.

2. A tool holder for fixing to the spindle of a machine tool adapted to align said spindle in a predetermined position about the spindle axis, said tool holder having a body for attachment to said spindle, a tool holding slide mounted slideably on said body and locking means arranged normally to lock said slide relative to said body, wherein the improvement comprises an abutment fixed to the machine tool, an operating member for causing said locking means to unlock said slide by pressure thereof against said abutment, means for moving the aligned spindle and said abutment relative to one another to produce such pressure, at least one compression spring deposed between said slide and said body for urging said slide in one direction when it is unlocked, said slide being movable in the other direction by pressure against a second abutment fixed to a machine frame, means for moving the aligned spindle and said second abutment relative to one another to produce the movement in said other direction, and a roller mounted on said slide for bearing against said second abutment, said operating member being guided in said body to move perpendicular to the direction of movement of said slide.

3. A toolholder according to claim 1, comprising a screw mechanism for shifting said rod axially, one element of said mechanism being fixed to said body, while the other element of said mechanism is integral with a gear in mesh with a rack forming said operating member, a roller fixed to said rack bearing against said abutment.

4. A toolholder according to claim 1, comprising a plurality of seats on said slide each one adapted to house a tool, a seat of said plurality being disposed radially, two other seats of said plurality being disposed axially in the same diametral plane, but at different distances from the axis of the toolholder.

5. A machine tool comprising a spindle and means to align the spindle in a predetermined angular position about its own axis, a toolholder fixed to the spindle, said toolholder comprising a body engageable with said spindle and a slide radially shiftable on said body, locking means normally locking said slide on said body, a worktable and a single member fixable to the worktable and carrying two abutments at 90° to one another with one abutment parallel to said slide when said spindle is aligned, means for moving said worktable and said spindle relative to each other in two directions parallel to said abutments respectively, and means cooperating with said abutments to render said locking means ineffective and to produce a radial shifting of said slide on said body.

6. A tool holder for attachment to the spindle of a machine tool having a frame means to align said spindle in a predetermined angular position about its spindle axis, comprising:
   a body for attachment to said spindle,
   a tool holding slide mounted on said body and being movable on said body radially with respect to the spindle axis,
   locking means engageable with said slide and movable between a normal locked position locking said slide relative to said body and an unlocked position freeing said slide for movement,
   a pressure actuated operating member engageable with said locking means for moving said locking means to said unlocked position,
   an abutment fixed to said machine frame and engageable with said operating member,
   means for moving said operating means into pressure engagement with said abutment when said spindle is in said predetermined angular position to thereby unlock said tool holding slide, and
   means for displacing said tool holding slide radially with respect to the spindle axis when said tool holding slide is in said unlocked position comprising at least one compression spring disposed between said slide and said body for urging said slide in one direction when said slide is unlocked, a second abutment fixed to said machine frame and engageable with said slide for moving said slide in the other direction, and means for moving said slide in said other direction when said spindle is in said predetermined position.

7. A tool holder for attachment to the spindle of a machine tool having a frame means to align said spindle in a predetermined angular position about its spindle axis, comprising:
   a body for attachment to said spindle,
   a tool holding slide mounted on said body and being movable on said body radially with respect to the spindle axis, said slide having a plurality of seats each adapted to house a tool, one said seat being disposed radially and two other said seats being disposed axially in the same diametral plane but at different distances from the axis of said tool holder,
   locking means engageable with said slide and movable between a normal locked position locking said slide relative to said body and an unlocked position freeing said slide for movement,
   a pressure actuated operating member engageable with said locking means for moving said locking means to said unlocked position,
   an abutment fixed to said machine frame and engageable with said operating member,
   means for moving said operating means into pressure engagement with said abutment when said spindle is in said predetermined angular position to thereby unlock said tool holding slide, and
   means for displacing said tool holding slide radially with respect to the spindle axis when said tool holding slide is in said unlocked position.

8. A tool holder according to claim 8 further comprising at least one compression spring disposed between said slide and said body for urging said slide in one direction when said slide is unlocked, a second abutment fixed to said machine tool and engageable with said slide for moving said slide in the other direction, and means for moving said spindle and said second abutment relative to one another to produce the movement in said other direction when said spindle is in said predetermined position.

* * * * *